United States Patent [19]

Hofmann

[11] Patent Number: 4,940,312
[45] Date of Patent: Jul. 10, 1990

[54] SCANNING PRISM

[75] Inventor: Otto Hofmann, Kirchstockach, Fed. Rep. of Germany

[73] Assignee: Messerschmitt-Bölkow-Blohm GmbH, Munich, Fed. Rep. of Germany

[21] Appl. No.: 249,355

[22] Filed: Sep. 23, 1988

[30] Foreign Application Priority Data

Sep. 23, 1987 [DE] Fed. Rep. of Germany ....... 3732068

[51] Int. Cl.$^5$ .......................... G02B 5/04; G02B 26/10
[52] U.S. Cl. ...................................... 350/286; 350/6.4
[58] Field of Search .................. 350/6.1, 6.2, 6.4, 286, 350/287

[56] References Cited

FOREIGN PATENT DOCUMENTS

| | | |
|---|---|---|
| 2121918 | 11/1972 | Fed. Rep. of Germany ....... 350/6.4 |
| 2940871 | 11/1983 | Fed. Rep. of Germany . |
| 3043577 | 11/1983 | Fed. Rep. of Germany . |
| 3219032 | 9/1985 | Fed. Rep. of Germany . |
| 3517671 | 11/1986 | Fed. Rep. of Germany . |

OTHER PUBLICATIONS

"Dynamische Photogrammetrie", *Bildmessung and Luftbildwesen*, No. 3, 1988, by Otto Hofmann.

*Primary Examiner*—Bruce Y. Arnold
*Assistant Examiner*—Ronald M. Kachmarik
*Attorney, Agent, or Firm*—Toren, McGeady

[57] ABSTRACT

The determination of the orientation parameters of a missile by means of a three-line scanner requires the generation of scanning traces which are oriented at a specific angle with respect to the direction of flight. In the present invention the scanning traces are produced with a two or four part scanning prism, whose reflecting surfaces are arranged at a specific angel β with respect to the axis of rotation of the scanning prism.

3 Claims, 4 Drawing Sheets

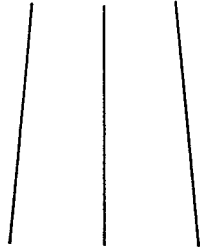
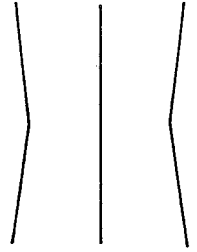
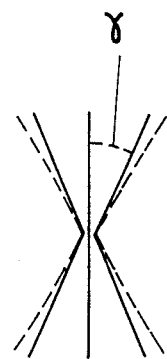
PRIOR ART
FIG. 1(a)
PRIOR ART
FIG. 1(b)
PRIOR ART
FIG. 1(c)

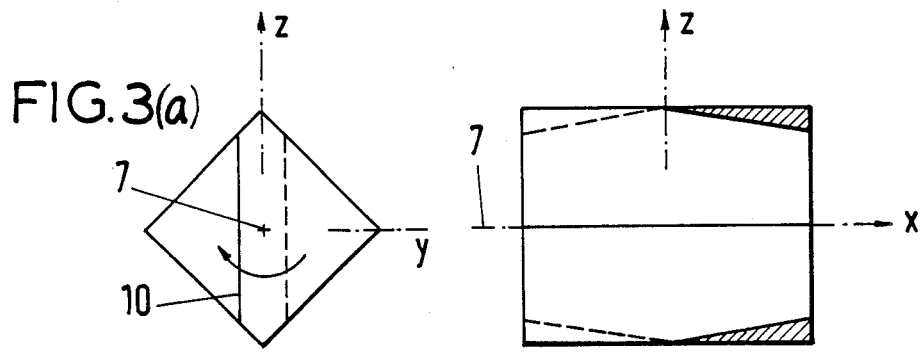
FIG.3(a)
FIG.3(b)
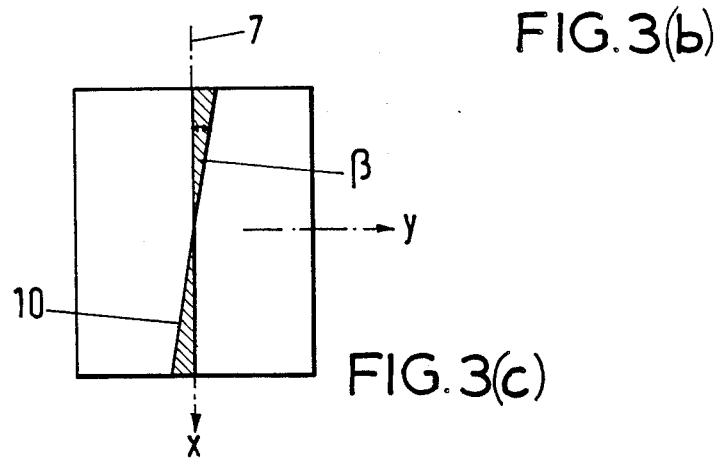
FIG.3(c)
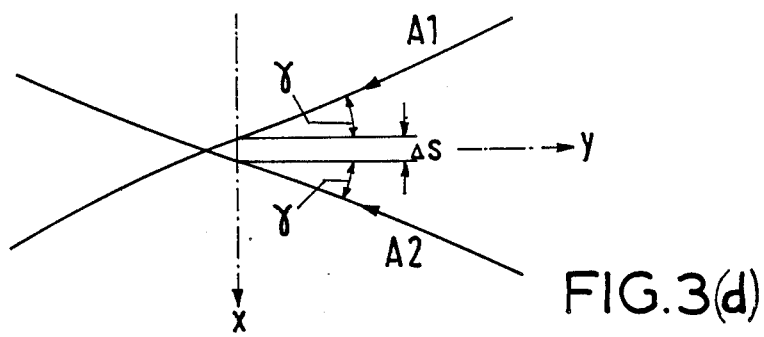
FIG.3(d)

SCANNING PRISM

FIELD AND BACKGROUND OF THE INVENTION

The present invention related in general to scanning equipment on a missile or other moving object, and in particular to a new and useful scanning prism which has reflecting surfaces that are inclined at a specific angle with respect to an axis of rotation for the prism.

For determination of the orientation parameters of a three line scanner aboard a missile or other moving object, there is a requirement for the generation of scanning traces which form a specific angle with respect to the flight path. Apparatus and methods are described in German patents Nos. DE 29 40 871 C 2, DE 30 43 577 C 2 and DE 32 19 032 C 2, which provide for the determination of the orientation parameters of a camera and a terrain model of the terrain being scanned, by means of opto-electronic scanners using three semiconductor sensor lines.

The German patent application No. P 35 17 671.7 expands on this method and utilizes it with opto-mechanical scanners. It is demonstrated in the above mentioned German patent No. 30 43 577, and investigations and publications based thereon (for instance Hoffmann, O.:, "Dynamische Photogrammetrie", Bildmessung und Luftbildwesen, No. 3, 1986), that the angular arrangements of the two outer sensor lines arranged in the image plane of a lens, together with the angular scanning traces produced by the lens, achieve a greater stability and accuracy of the model computation (orientation parameters and terrain points) than parallel arrangements for the sensor lines. In FIG. 1a of the present application the outer sensor lines or their traces in the terrain extend in a trapezoidal manner, and in FIG. 1b they are slightly arrow-shaped. In the extreme case of flight at low altitude it has proved favorable to change these arrow-shaped scanning traces of the outer sensors because of accuracy and stability, to such an extent, that the arrow tips point approximately toward the middle of the central sensor line or scanning trace and that the arrow angles are increased to approximately 30° (FIG. 1c). It is not necessary that the scanning traces generated by the sensors extend precisely in a straight manner. They can, for instance, be slightly curved in a hyperbolic like fashion, as indicated by the dotted lines in FIG. 1c. In the above-mentioned German patent application No. P 35 17 671.7, the outer traces are produced by rotating mirrors with mirror normal lines that are inclined with respect to the axis of rotation. This necessarily produces scanning traces similar in shape to a hyperbola.

Scanning with rotating mirrors, however, especially in case of large imaging angles of up to 180°, results in unwieldy large mirror surfaces, large apparatus dimensions and high moments of rotation or torque. In the following it is explained how these disadvantages can be avoided with a rotating prism of special design in accordance with the present invention.

It is known that in case of a two or four part scanning prism (see German patent application No. P 21 21 918.1, Scanning Prism), arranged in front of a lens 1 shown in FIG. 2a, two or four sweeps are produced in the course of one revolution of the prism 3 around its axis 7, depending on whether the prism is constructed in two or four parts. Herein, the bundle of rays on the optical axis 2 striking the prism at an angle $\alpha$ is deflected respectively in the direction of the rays 4 by a double amount $2\alpha$. The scanning traces 9 of the bundle of rays 4 as shown in FIG. 2b, produced in the plane of the object 8, extend perpendicularly to the axis of rotation 7 of the scanning prism (x-direction of the scanner), wherein the plane of the object 8 is located parallel to the axis of rotation 7 of the scanning prism and normally with respect to the optical axis 2 of the lens 1. In order to generate the scanning traces, which extend at a specific angle with respect to the x-axis of the scanner or the direction of flight (see FIGS. 1c, 3, 4), the reflecting surfaces 5 and 6 are changed in the present invention. In the known structures these reflecting surfaces 5 and 6 stand at right angles to each other and their line of intersection lies in the axis of rotation 7 of the scanning prism.

In the present invention, these reflecting surfaces are inclined at a specific angle $\beta$ with respect to the axis of rotation 7 of the scanning prism.

SUMMARY OF THE INVENTION

An object of the present invention is thus to provide a quadratic two or four part scanning prism which rotates about an axis of symmetry and which has at least one reflecting surface that is inclined at a specific angle $\beta$ with respect to the axis of rotation, the reflecting surface intersecting the axis of rotation near the middle of the prism.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there is illustrated and described the preferred embodiments of the invention.

BRIEF DESCRIPTION OF THE DRAWINGS

In the drawings:

FIGS. 1a, 1b and 1c are respective schematic representations of scan lines (traces) produced by opto-electronic or opto-mechanical sensors generating three scan lines with the two outer scan lines being arranged either trapezoidally, in a slightly arrow shaped manner or in an increased arrow shaped manner;

FIG. 2b is a plan view of the scanning traces for the scanning prism of FIG. 2a;

FIG. 3a is a side elevational view of a two-part prism in accordance with the present invention;

FIG. 3b is a front profile view of the prism of FIG. 3a;

FIG. 3c is a top plan view of the prism of FIG. 3a;

FIG. 3d is a plan view showing the scan lines produced by the prism of FIG. 3a;

DESCRIPTION OF THE PREFERRED EMBODIMENTS

Figure 2A:
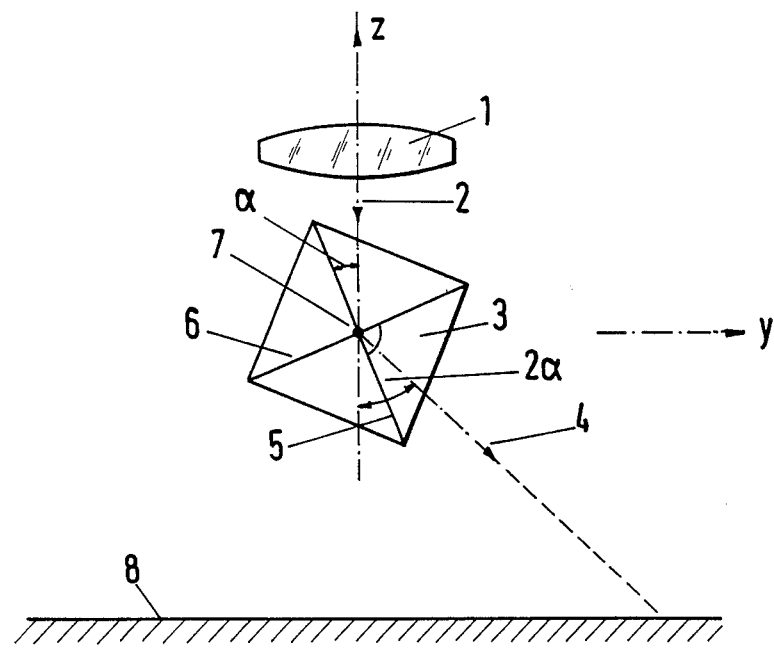
FIG. 2A is a schematic side elevational view of a lens system and conventional scanning prism.
Figure 2B:
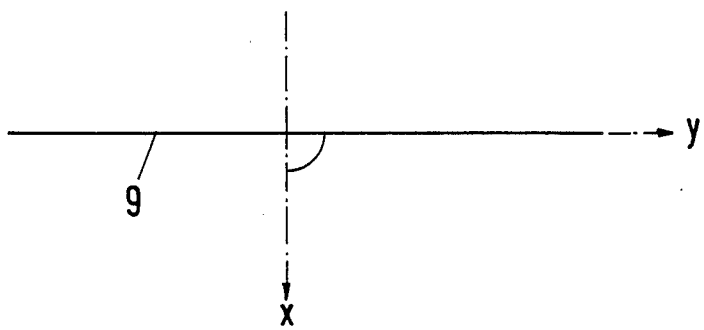
Figure 4A:
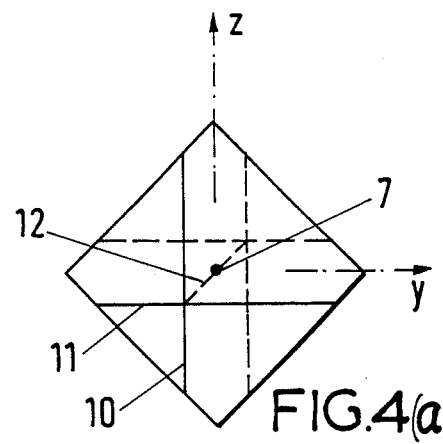
FIG. 4a is a view similar to FIG. 3a of a four-part scanning prism in accordance with the present invention.
Figure 4B:
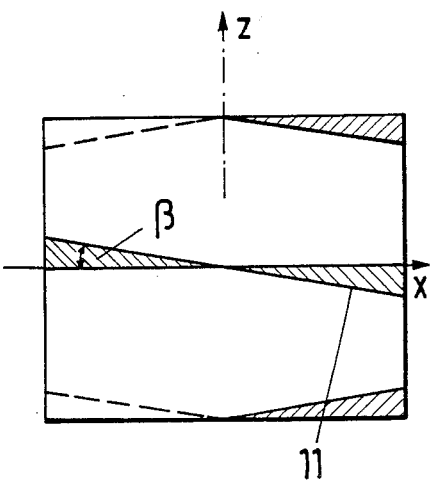
FIGS. 4b, 4c and 4d are views of the prism of FIG. 4a which are respectively similar to FIGS. 3b, 3c and 3d.
Figure 4C:
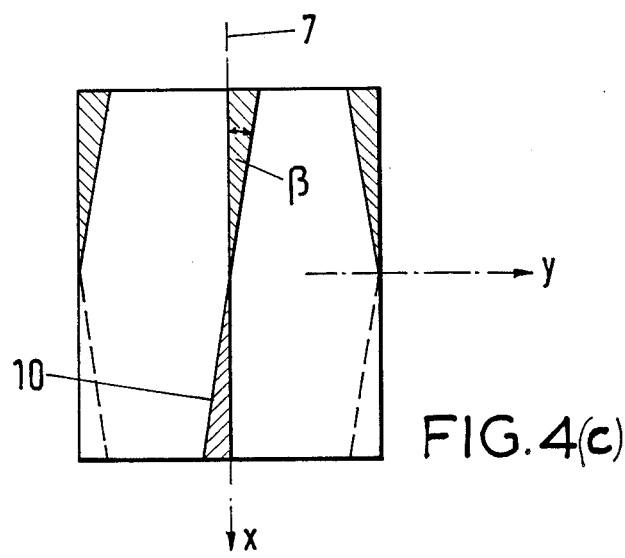
Figure 4D:
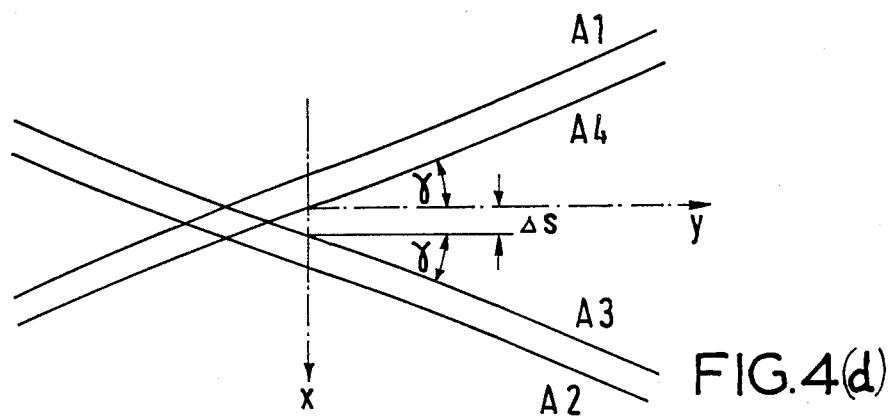

Referring to the drawings in particular, the invention embodied in FIGS. 3a–3d and 4a–4d comprises a two and four part prism respectively constructed in accordance with the present invention.

A two-part prism is depicted in FIGS. 3a to 3d. The inclination β of the reflecting surface 10 produces, in the course of a complete revolution of the prism, two slightly curved hyperbola-like scanning traces A1, A2 which cross each other upon the object plane as shown in FIG. 3d. In case of a simultaneous forward movement of the scanner in the X-direction, the offset Δs is produced between the two scanning traces.

A four-part prism is adepicted in FIGS. 4a to 4d. The two reflecting surfaces 10, 11 intersect at a right angle, but their line of intersection 12 (see FIG. 4a) no longer coincides with the axis of rotation of the prism 7.

A complete revolution of the four-part scanning prism shown in FIG. 4a to 4d, produces four scanning traces A1, A2, A3, A4 which cross each other.

The narrow triangular surfaces (shaded) between the lines of intersection of the reflecting surfaces with the prism faces and the roof edges of the scanning prism must be covered, since they would otherwise direct undesirable ghost light into the path of the rays.

Specific embodiments of the invention have been shown and described in detail to illustrate the application of the inventive principles.

I claim:

1. Optical scanning means, for use in a scanning system, for producing scanning lines of an object as the system moves past the object, said optical scanning means comprising:
   a quadratic two-part scanning prism rotatable around an axis of symmetry, said prism comprising a prism body having opposite roof edges, and having a reflecting surface inclined at an angle β with respect to the axis of rotation and intersecting the middle of the axis of rotation and intersecting the roof edges of the prism body on opposite sides of the middle, said angle β being such that crossing scanning lines are produced when the prism is rotated and the system moved past the object.

2. Optical scanning means, for use in a scanning system, for producing scanning lines of an object as the system moves past the object, said optical scanning means comprising:
   a quadratic four-part scanning prism which is rotatable around an axis of symmetry, said prism comprising a prism body having opposite roof edges, and having two reflecting surfaces that are inclined at an angle β with respect to the axis of rotation, said reflecting surfaces extending at a right angle with respect to each other and each intersecting the middle of the axis of rotation and each intersecting the roof edges of the prism body on opposite sides of the middle, said angle β being such that crossing scanning lines are produced when the prism is rotated and the system moved past the object.

3. An optical scanning means according to claims 1 or 2, wherein triangular surfaces formed between the roof edges of the prism body and the lines of intersection of each reflecting surface with the prism surfaces are covered to prevent false images.

* * * * *